United States Patent
Bedingfield, Sr.

(10) Patent No.: US 7,640,507 B2
(45) Date of Patent: Dec. 29, 2009

(54) METHODS, SYSTEMS, AND PRODUCTS FOR CALENDARING APPLICATIONS

(75) Inventor: James C. Bedingfield, Sr., Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 472 days.

(21) Appl. No.: 11/068,418

(22) Filed: Feb. 28, 2005

(65) Prior Publication Data

US 2006/0203620 A1 Sep. 14, 2006

(51) Int. Cl.
*G06F 3/00* (2006.01)
(52) U.S. Cl. .................. 715/752; 715/751; 715/753; 709/204; 709/205; 709/206; 709/207
(58) Field of Classification Search ......... 715/751–753; 709/204–207
See application file for complete search history.

(56) References Cited

U.S. PATENT DOCUMENTS

| | | | |
|---|---|---|---|
| 5,097,429 A | | 3/1992 | Wood |
| 5,634,100 A | * | 5/1997 | Capps ........................... 705/9 |
| 5,842,009 A | * | 11/1998 | Borovoy et al. ................. 707/1 |
| 5,855,006 A | * | 12/1998 | Huemoeller et al. ........... 705/9 |
| 5,884,306 A | * | 3/1999 | Bliss et al. ...................... 707/7 |
| 5,970,466 A | * | 10/1999 | Detjen et al. .................... 705/8 |
| 6,462,660 B1 | | 10/2002 | Cannon |
| 6,466,969 B1 | * | 10/2002 | Bunney et al. ............... 709/206 |
| 6,504,908 B1 | * | 1/2003 | Bellomo et al. ................ 379/38 |
| 6,587,036 B2 | | 7/2003 | Somers |
| 7,188,073 B1 | * | 3/2007 | Tam et al. ....................... 705/9 |
| 2002/0024540 A1 | * | 2/2002 | McCarthy .................... 345/844 |
| 2002/0076015 A1 | * | 6/2002 | Norwitz et al. .......... 379/93.09 |
| 2003/0005150 A1 | * | 1/2003 | Thompson et al. .......... 709/238 |
| 2003/0097361 A1 | * | 5/2003 | Huang et al. ................... 707/10 |
| 2003/0171973 A1 | | 9/2003 | Wilce |
| 2004/0131050 A1 | * | 7/2004 | Beringer et al. ............. 370/352 |
| 2004/0142711 A1 | | 7/2004 | Mahonen et al. |
| 2004/0243547 A1 | * | 12/2004 | Chhatrapati et al. ............ 707/2 |
| 2006/0074844 A1 | * | 4/2006 | Frankel et al. ................. 707/1 |
| 2006/0150175 A1 | | 7/2006 | Etelapera |

OTHER PUBLICATIONS

Talking Reminder user manual, published 2004, pp. 1-26.*
Gordon Padwick, ebook titled "Special Edition Using Microsoft Outlook 2002", published on May 17, 2001, pp. 1-42.*

* cited by examiner

*Primary Examiner*—Weilun Lo
*Assistant Examiner*—Tuyetlien T Tran
(74) *Attorney, Agent, or Firm*—Scott P. Zimmerman PLLC

(57) ABSTRACT

Methods, systems, and products are disclosed for managing events in an electronic calendar. One such method associates an event with a rule, with the rule comprising a reminder and a date and a time of expiration. A calendar entry corresponding to the event is stored. After the date and time of the expiration, the electronic calendar ceases to present the reminder when launched. That is, when the electronic calendar is initialized, no reminders of expired events are visually/audibly presented by the electronic calendar.

17 Claims, 10 Drawing Sheets

METHODS, SYSTEMS, AND PRODUCTS FOR CALENDARING APPLICATIONS

CROSS-REFERENCE TO RELATED APPLICATIONS

This application relates to the commonly assigned U.S. patent application Ser. No. 11/095,391, filed Mar. 31, 2005 and entitled "Methods, Systems, and Products for Calendaring Applications", and incorporated herein by reference.

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to electrical communications and to data processing and, more particularly, to scheduling, to task assignment, and to reminders in electronic calendaring applications.

Conventional electronic calendaring applications utilize reminders. These calendaring applications allow users to create calendar entries and to associate the entries with dates and times. These calendaring applications also allow users to establish reminders of the calendared events. The user may even specify at what date and time the reminder is presented prior to the event.

These conventional reminders, however, have a common annoyance. Unless the user cancels or dismisses the reminder, the conventional calendaring application continues to present the reminder. It's not uncommon to have reminders that are days or weeks "overdue." At some date or time the reminder becomes pointless. That is, if the user has not canceled/dismissed the reminder by a particular date and/or time, the calendaring application could assume the reminder is no longer useful to the user. If the reminder "expires," the calendaring application would not waste processor time presenting a pointless reminder. What is needed, then, is a calendaring application that permits reminders to expire.

SUMMARY

The aforementioned problems, and other problems, are reduced, according to the exemplary embodiments, using methods, systems, and products that manage entries in electronic calendar software applications. Each entry in the calendar is associated with an event and a rule. The rule defines a date and/or a time at which the event is to occur. The rule may include a date and a time at which the user desires a reminder of the event. The rule, however, also includes an expiration. The expiration describes a date and/or a time at which the reminder expires. That is, when the reminder expires, the calendaring application ceases to remind the user of the calendared event. The event may remain on the user's calendar, but the calendaring application will no longer remind the user of the event. The expiration described by the exemplary embodiments prevents the calendaring application from reminding the user of "stale" or outdated events. Even if the user fails/forgets to cancel or dismiss the reminder, the reminder is no longer processed after expiration. Even if the user re-launches the calendaring application, once an event expires, no reminder is presented.

According to exemplary embodiments, the expiration is configurable. The expiration comprises at date and a time at which the reminder expires. Upon expiration the calendaring application ceases to process, or disposes of, that portion of the rule that defines the reminder. The user can define at what date, and/or at what time, expiration occurs. The user may decide that some event has a "hard" due date, after which any reminder is pointless. An executive, for example, may require that employees be promptly seated at the start time or, else, not attend. In such an instance, a tardy reminder is pointless. A reminder of your spouse's belated birthday is perhaps also a pointless/useless reminder. The expiration, then, may be configured such that, after a certain date/time, no reminder is produced. Some calendar events, however, may lend themselves to "overdue" reminders. A task, for example, having a low priority may "slide" on the user's calendar. The user wants to be reminded of the task and doesn't mind daily "overdue" reminders. The user, then, can configure the task's associated rule such that the reminder endures. The user, alternatively, may decide that once the task is a month "overdue," the priorities are such that the task will not be accomplished. The user may decide, then, that reminders should expire at one month past the event's due date. The user may even configure the expiration to resume reminders at a future date, perhaps reminding the user of a past task that was not accomplished.

The exemplary embodiments include methods, systems, and products for managing events in an electronic calendar. One such exemplary embodiment associates an event with a rule, with the rule comprising a reminder and an expiration. A calendar entry corresponding to the event is stored in memory. After the expiration, the exemplary embodiment ceases to present the reminder when launching the electronic calendar. The reminder portion of the rule is thus disposable, whereupon at the date and time of expiration no reminder of the now-expired event is presented by the electronic calendar. The electronic calendar is thus not burdened and/or cluttered with expired events.

In another of the embodiments, a system manages events in an electronic calendar. An electronic calendar is stored in memory, and a processor communicates with the memory. The processor executes an event associated with a rule, with the rule comprising a reminder and an expiration. The processor also executes a calendar entry corresponding to the event. The processor, upon and/or after the expiration, ceases to execute the reminder when launching the electronic calendar. Whereupon expiration no reminder of the expired event is executed by the processor.

In yet another embodiment, a computer program product manages events in an electronic calendar. An electronic calendar is stored on a computer-readable medium. The electronic calendar includes computer code for associating an event with a rule. The rule includes a reminder and an expiration. A calendar entry corresponding to the event is stored in memory. After the expiration expires, the electronic calendar ceases to present the reminder upon launch.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, a calendaring application manages entries in an electronic calendar. Each entry in the calendar is associated with an event and a rule. The rule defines a date and/or a time at which the event is to occur. The rule may include a date and a time at which the user desires a reminder of the event. The rule, however, also includes an expiration. The expiration describes a date and/or a time at which the reminder expires. That is, when the reminder expires, the calendaring application ceases to remind the user of the calendared event. The event may remain on the user's calendar, but the calendaring application will no longer remind the user of the event. The expiration described by the exemplary embodiments prevents the calendaring application from reminding the user of "stale" or outdated events. Even if the user fails/forgets to cancel or dismiss the reminder, the reminder is no longer processed after expiration. Even if the user re-launches the calendaring application, once an event expires, no reminder is presented.

Figure 1:
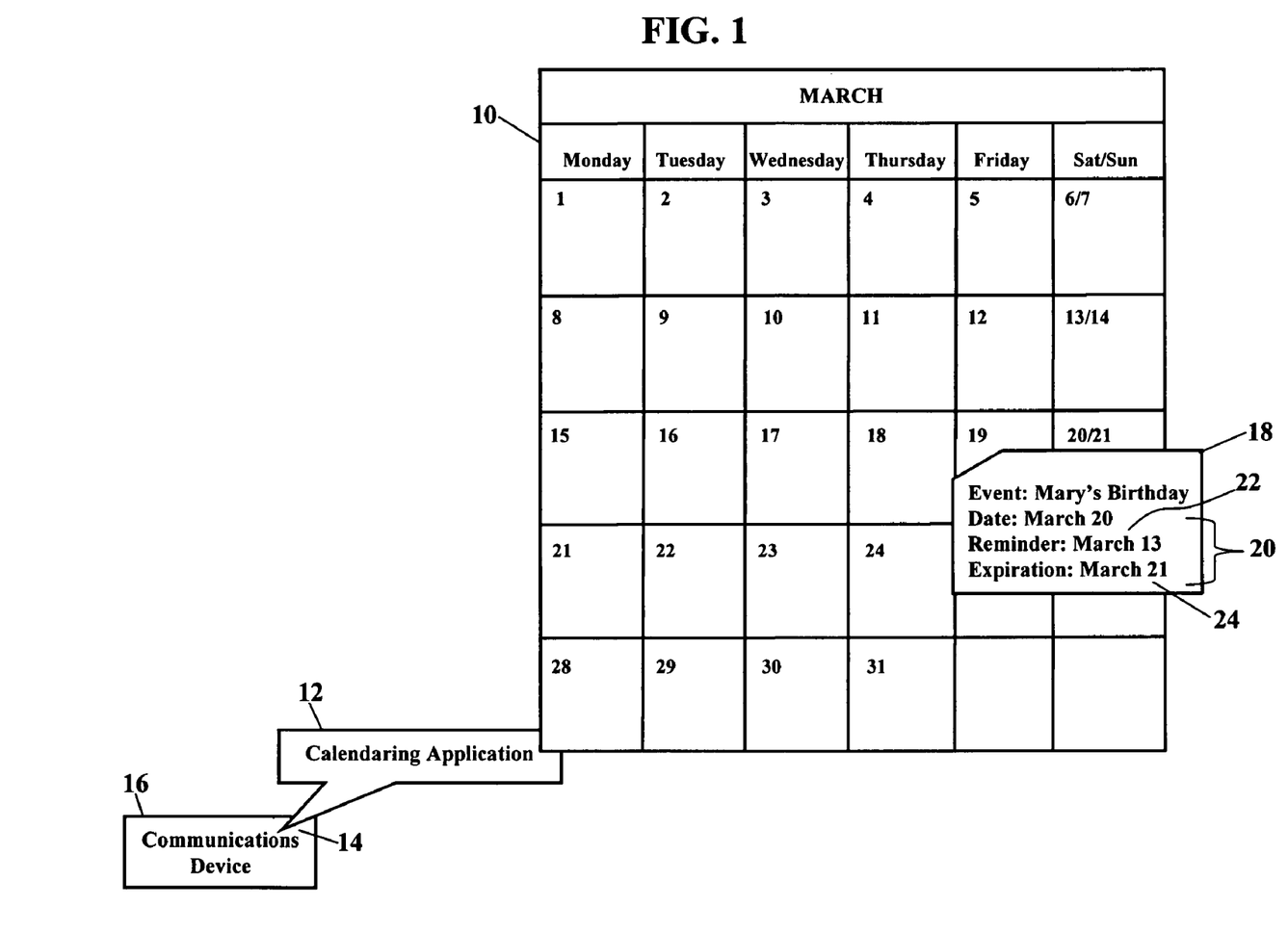
FIG. 1 is a schematic illustrating an electronic calendar produced by a calendaring application, according to the exemplary embodiments.

FIG. 1 is a schematic illustrating an electronic calendar 10 according to an exemplary embodiment. The electronic calendar 10 is produced by a calendaring application 12 stored in memory 14 of a communications device 16. Although the communications device 16 is generically shown, the communications device 16, as will be later explained, may be a computer, a personal digital assistant (PDA), a cordless/cellular/IP phone, or other wireline/wireless communications device. The calendaring application 12 tracks an event 18, such as an appointment, a meeting, a holiday, a birthday, other occasion, important dates, deadlines, and/or anniversaries. The calendaring application 12 associates the event 18 with a rule 20. The rule 20 may comprise a date and/or a time at which the event is to occur. The calendaring application 12 stores a calendar entry corresponding to the event 18. As FIG. 1 shows, for example, the event 18 is "Mary's Birthday," and the rule 20 specifies an event date of March $20^{th}$. The rule 20 may also comprise a reminder 22. The reminder 22 may includes a date and a time at which a notification or an alert is audibly and/or visually presented by the calendar application 12. The reminder 22 provides advance notice of the approaching event 18. The alert, for example, may be an audible sound, alarm, and/or visual notification that reminds a user of the upcoming event 18. FIG. 1, for example, illustrates that the reminder 22 will be presented one week prior to Mary's birthday. Those skilled in the art will appreciate that there are many suitable implementations for the calendaring application 12 MICROSOFT®, for example, offers OUTLOOK® and OUTLOOK EXPRESS®, both of which provide electronic calendars (MICROSOFT®, OUTLOOK®, and OUTLOOK EXPRESS® are registered trademarks of Microsoft Corporation, One Microsoft Way, Redmond Wash. 98052-6399, 425.882.8080, www.Microsoft.com). Other vendors also offer other calendaring software applications, and the concepts described herein may be applied to any calendaring application by any vendor. The concepts described herein are also applicable to both GUI-based calendaring applications and to text-based calendaring applications.

In addition to the calendaring features provided by conventional calendaring applications, exemplary embodiments described below include an expiration 24. As FIG. 1 illustrates, the rule 20 comprises both the reminder 22 and the expiration 24. The expiration 24 defines a date and/or a time at which the reminder 22 is no longer presented. Before the date and the time of the expiration 24, the calendar application 12 presents an audible/visual notification of the reminder 22, as defined by the rule 20. When the calendar application 12 determines that an external and/or internal clock source/frequency/oscillator (such as a system clock, Windows Time, and/or an online/networked source) matches the date/time of the expiration 24, the calendar application 12 ceases to audibly/visually present the reminder 22. When the calendar application 12 is then again launched, the calendar application 12 will not produce reminders of the expired event 18. The terms "launch," "launched," "launches," and its variants mean the calendaring application is opened, initialized, or started. The concept of the expiration 24 may be applied to both one-time calendar events and to recurring events. The expiration 24 of the reminder 22 would naturally recur when the event recurs on the calendar.

Figure 2:
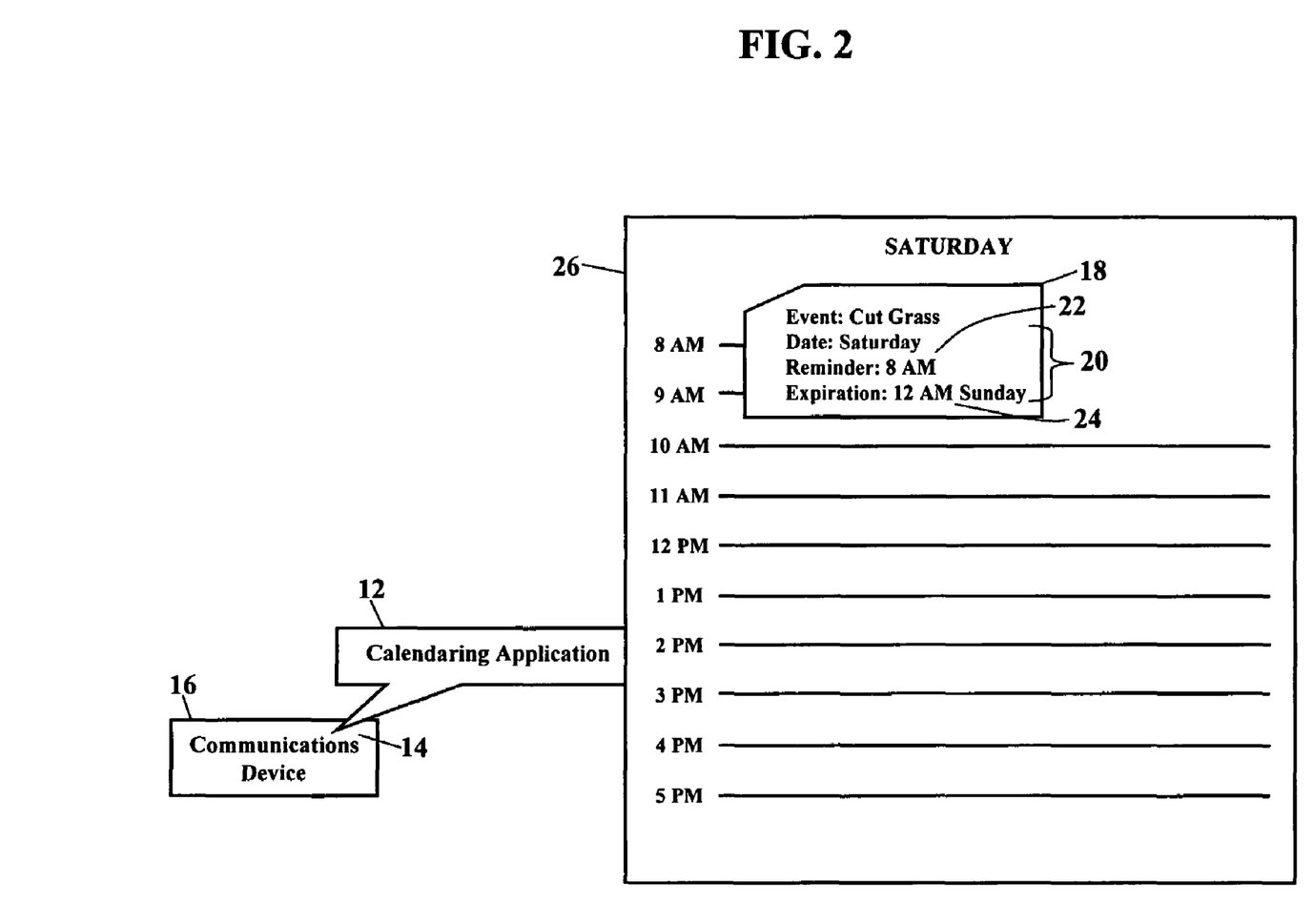
FIG. 2 is a schematic illustrating an expiration feature of the electronic calendar, according to the exemplary embodiments.

FIG. 2 is a schematic further illustrating the exemplary embodiments. Suppose the user decides to schedule time on Saturday to cut grass. FIG. 2 illustrates the user's calendar 26 for Saturday. The user defines the rule 20 to specify that the event 18 (here "Cut Grass") has an event date of Saturday. The user also defines the rule 20 to include the event reminder 22 for Saturday morning at 8 AM. The user, however, also defines the rule 20 to include the expiration 24 for Saturday at midnight. So, should the user launch the calendaring application 12 Saturday morning, the reminder 22 will alert the user of the scheduled time for cutting the grass.

Without including the expiration 24 in the rule 20, the reminder 22 is again presented each time the user re-launches the calendaring application 12, unless the user cancels or dismisses the reminder 22. Thus, for example, if the user "closes" or "logs out" of the calendaring application 12, and then re-launches later that same Saturday, the reminder 22 is again presented to the user. Conventional calendaring applications, in fact, will continue to present the reminder 22 on Sunday, Monday, and onward until cancellation/dismissal.

The expiration 24, however, ceases presentation of the reminders 22. The expiration 24 defines a date and/or a time at which the reminder 22 is no longer presented. At and/or after the date and the time of the expiration 24, the calendaring application 12 ceases to audibly/visually present the reminder 22. When the calendaring application 12 is then again launched, the calendaring application 12 ceases to process rules having expired events. So, in this example, the user specified that the event 18 (again, "Cut Grass") includes the expiration of Saturday at midnight. So, when the calendaring application 12 is launched on Sunday, Monday, or any day onwards, the electronic calendaring application 12 ceases to process expired reminders. The calendaring application 12 will not notify the user of events that have expired.

Figure 3:
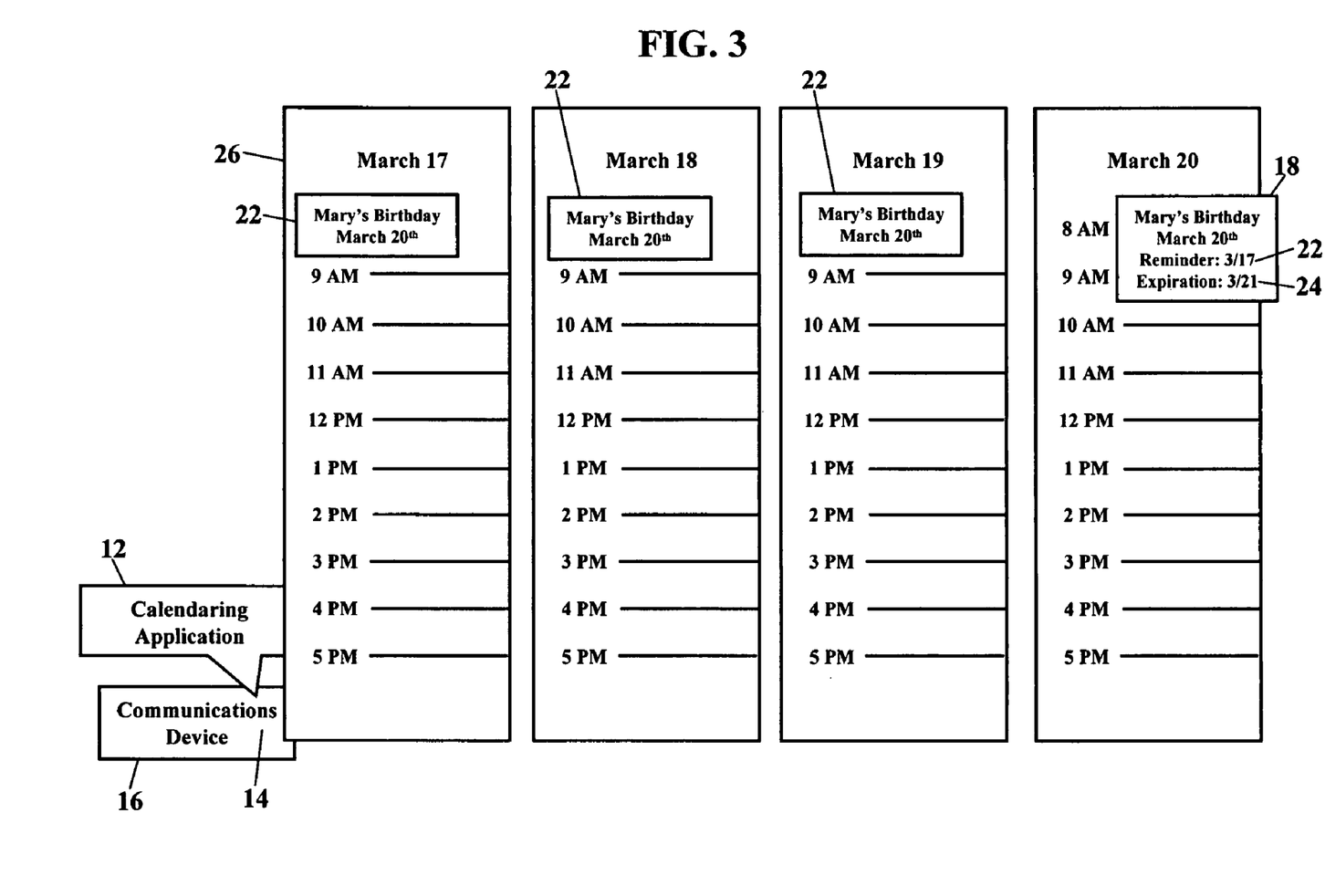
FIG. 3 is a schematic further illustrating the expiration feature, according to even more exemplary embodiments.

FIG. 3 is a schematic further illustrating the exemplary embodiments. FIG. 3 illustrates another example of the expiration 24 using four (4) consecutive days of the user's calendar. Suppose Mary's birthday is March $20^{th}$. The user defines the rule 20 to specify that the event 18 (here "Mary's Birthday") has an event date of March $20^{th}$. The user also specifies that the event reminder 22 is to occur three days prior to the event date of March $20^{th}$. (Although not necessary for this example, the event date 18 and the event reminder 22 may even include a time component.) That is, the user wants a reminder three days prior to Mary's birthday. The calendaring application 12, therefore, will produce an audible (e.g., "ding") and/or visual notification (e.g., "pop-up" window) of the reminder 22 on March $17^{th}$. Unless the user cancels/dismisses the reminder 22, or reschedules the reminder 22, the calendaring application 12 will continue to present the audible and/or visual notification of "Mary's Birthday" on March $18^{th}$, March $19^{th}$, and March $20^{th}$. The prior art calendaring applications, in fact, will continue to present the audible/visual notification of "Mary's Birthday" on a daily basis, even after the event date. Although Mary's birthday is March $20^{th}$, prior art calendaring applications will present notifications on March $21^{st}$, March $22^{nd}$, and onward until cancellation/dismissal. So, even though reminders of "Mary's Birthday" are perhaps pointless after March $20^{th}$, the prior art calendaring applications continue to produce notifications of "Mary's Birthday" until cancellation.

The expiration 24 causes the calendaring application to cease presentation of reminders. In one embodiment, the expiration 24 defines a date and/or a time at which the reminder 22 will no longer be presented. At and/or after the date and the time defined by the expiration 24, the calendaring application 12 ceases to audibly/visually present the reminder 22. When the calendaring application 12 is then again launched, the calendaring application 12 ceases to process rules having expired events. So, in the example of "Mary's Birthday," the user specifies that the event 18 (again, "Mary's Birthday") includes the expiration 24 of March $21^{st}$. This expiration 24 acknowledges that any reminder after the actual date of the event is pointless. So, when the calendaring application 12 is launched on March $21^{st}$, the calendaring application 12 ceases to process expired reminders. The calendaring application 12 will not notify the user of events that have expired, wherein a reminder is pointless.

According to exemplary embodiments, no cancellation is required to cease reminders. The expiration 24 is processed without subsequent user intervention. That is, once the user has defined the expiration 24 in the rule 20, the calendaring application 12 ceases to process expired rules associated with expired events. The calendaring application 12 ceases to process expired rules independent of clicks, inputs, or acknowledgments of the reminder and/or the event. The user is thus not burdened with reminders that have no present scheduling value or task value. The expiration 24 thus causes the rule 20 to be disposable at the date and time of expiration.

The event rules could be refreshed without re-launching the calendaring application 12. Each time the calendaring application 12 is refreshed, the calendaring application 12 reviews each event rule. Those rules that have expired since the last refresh, or since the last launch, would no longer be processed. Each refresh, then, would cause the calendaring application to review all the event rules and discard, ignore, delete, or otherwise not process expired events. A refresh, for example, could occur each time a window, corresponding to the calendaring application 12, is maximized or minimized. Most readers are assumed familiar with an operating system that permits simultaneous operation of more than one software application. Each running application is represented by a graphical window. The user can minimize or maximize each window, thus viewing each application's respective window. Here, then, the calendaring application 12 is refreshed each time its respective window is maximized/minimized. The calendaring application could additionally or alternatively include an icon or other graphical selection that causes a refresh. The refresh could also be an automatic feature of the calendaring application, perhaps periodically occurring according to schedule and/or to activity. Another refresh mechanism could be the expiration of a reminder interval. This reminder interval, also associated with the rule, would trigger a refresh of the calendaring application 12. The reminder interval would be a rule that presents a reminder, and the rule then re-presents that reminder according to an interval. The rule, for example, could provide a reminder three-days prior to a calendared event. That same reminder would then be presented every thirty (30) minutes afterwards, until expiration.

According to an exemplary embodiment, the calendaring application 12 may autonomously determine expiration. The calendaring application 12 could automatically discard or dispose of a reminder 22 after some condition or occurrence. The calendaring application 12, for example, could autonomously dispose of a rule, and/or its associated reminder, when stale. That is, the calendaring application 12 may be configured to disregard reminders after a predetermined number of hours, days, weeks, months, or some other time period. The user, for example, may configure the calendaring application 12 to automatically expire a reminder when one (1) week overdue.

The reminder 22 and the expiration 24 may be established according to a profile. As the above paragraphs demonstrate, the event 18, the rule 20, the reminder 22, and the expiration 24 may have many variables that define each component. The user may find it cumbersome, and perhaps even complicated, to configure a calendar entry with all these variables. These concepts, then, also include a profile for different types of reminders. When the user sets a new calendar entry, the user may choose what profile best describes the desired reminder. The user, for example, may define the event, and/or its associated reminder, as "critical." This "critical" profile would automatically establish the parameters that define the rule 18. A "critical" event would have a predefined type of reminder, a predefined pre-event notification interval, a predefined post-start-time reminder interval, and a predefined reminder expiration interval. This "critical" profile, then, would automatically establish what type of reminder is presented for the event. The profile would also automatically establish the date/time at which the reminder is first presented and at what interval the reminder is re-presented to the user. The profile would also automatically establish how and when the reminder is re-presented after the scheduled start of the event and when the reminder expires. Although only a "critical" profile is discussed in detail, the user could choose from several profiles in a menu. The available profiles, for example, could include "critical meeting," "personal reminder," "conference call," "low priority," or any other category. The calendaring application 12 could even permit the user to create/define new profiles, and the user would configure each profile to best suit their needs. When the user creates a new calendared event, the user would simply select the profile that best suits the event. The parameters of the rule associated with the event would then be automatically established. If some parameter does not suit the event, the user could individually modify that parameter to satisfy a specific need.

Figure 4:
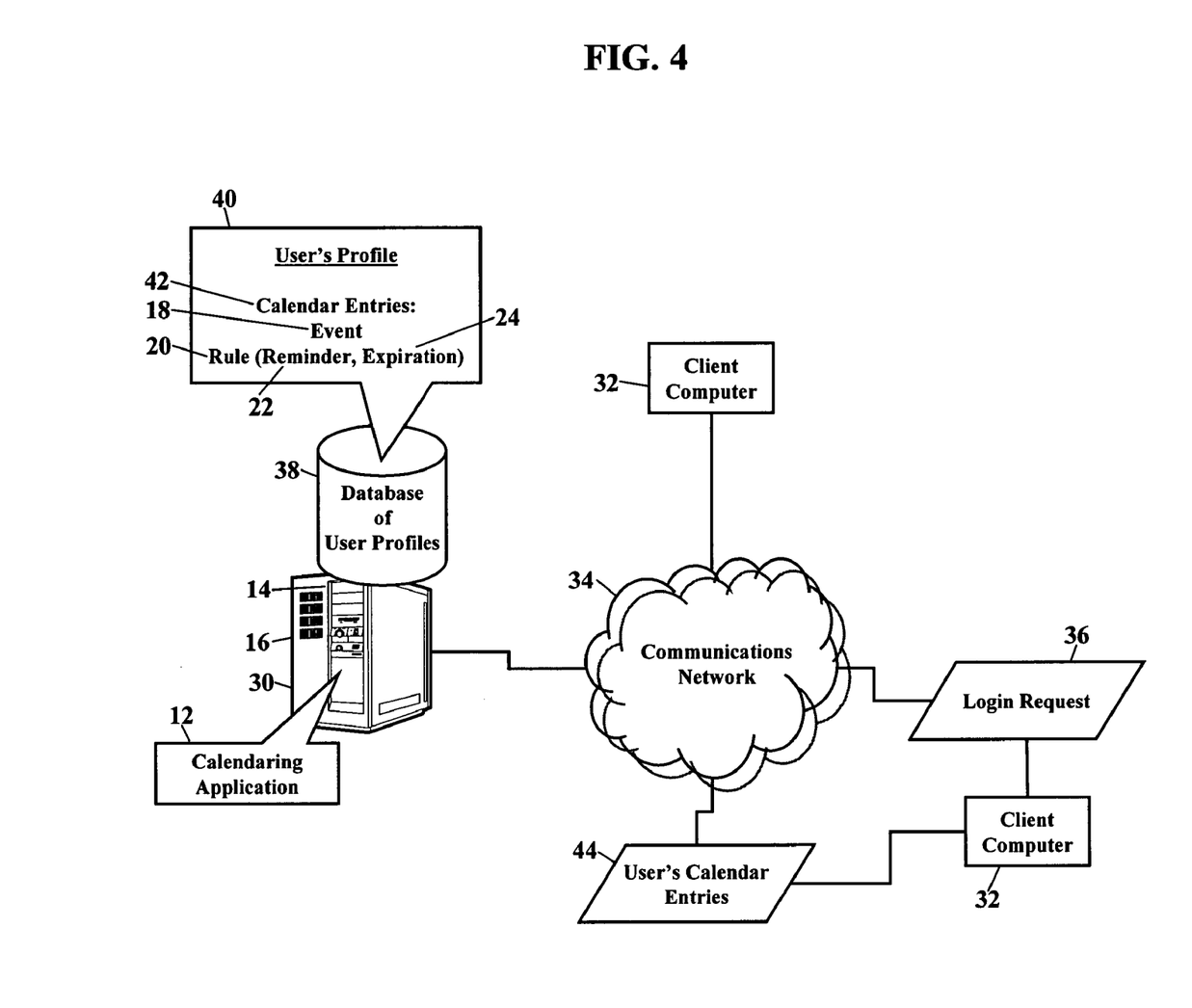
FIG. 4 illustrates an operating environment for the exemplary embodiments.

FIG. 4 is a schematic illustrating one possible operating environment for the calendaring application 12. FIG. 4 shows the calendaring application 12 operating in a networked environment. The calendaring application 12, as before, is stored in the memory 14 of the communications device 16. Here, however, the communications device 16 is shown as a computer server 30. The calendaring application 12 and the computer server 30 communicate with one or more client computers 32 via a communications network 34. Some portions of the calendaring application 12 may operate within memory of the client computer 32. The communications network 34 may be a cable network operating in the radio-frequency domain and/or the Internet Protocol (IP) domain. The communications network 34, however, may also include a distributed computing network, such as the Internet (sometimes alternatively known as the "World Wide Web"), an intranet, a local-area network (LAN), and/or a wide-area network (WAN). The communications network 34 may include coaxial cables, copper wires, fiber optic lines, and/or hybrid-coaxial lines. The communications network 34 may even include wireless portions utilizing any portion of the electromagnetic spectrum and any signaling standard (such as the I.E.E.E. 802 family of standards, GSM/CDMA/TDMA or any cellular standard, and/or the ISM band).

The calendaring application 12 provides calendar services to a user of the client computer 32. When the user at the client computer 32 makes a login request 36 to the calendaring application 12, the calendaring application 12 retrieves the user's personal calendar entries. As FIG. 4 illustrates, the calendaring application 12 consults a database 38 of user profiles. The database 38 of user profiles stores a profile 40 for each authorized user. Each profile 40 stores the corresponding user's calendar entries 42. That is, each user's calendar entry comprises the event 18 and its associated rule 20. Each rule 20, as earlier explained, comprises the reminder 22 and the expiration 24. The calendaring application 12 return communicates a representation 44 of the user's calendar entries 42 to the client computer 32. Before return communicating user's calendar entries 42, however, the calendaring application prunes those events that have expired. The expiration 24 defines a date and/or a time at which the reminder 22 is no longer processed or presented. At and/or after the date and the time of the expiration 24, the calendaring application 12 prunes those reminders that have expired.

The expiration 24 is important in a work group environment. The networked calendaring application 12 illustrated in FIG. 4 may have hundreds, perhaps thousands, of users. The calendaring application 12, for example, might be offered to employees of a large corporation or government entity. The calendaring application 12 could also be distributed over the Internet to thousands of users, perhaps part of an Internet Service Provider's suite of subscriber features. All these users would each have their own user profile, and each user's profile could store many calendar events. The calendaring application 12, and the computer server 30, may execute hundreds or even thousands of individual calendar events at any one time. The expiration 24, however, prevents expired events from unnecessarily consuming software and processor time. As a result, the calendaring application 12 runs faster and the computer server 30 is more efficient. The expiration 24 also prevents the communications network 34 from carrying and from processing packets of data containing expired events.

Figure 5:
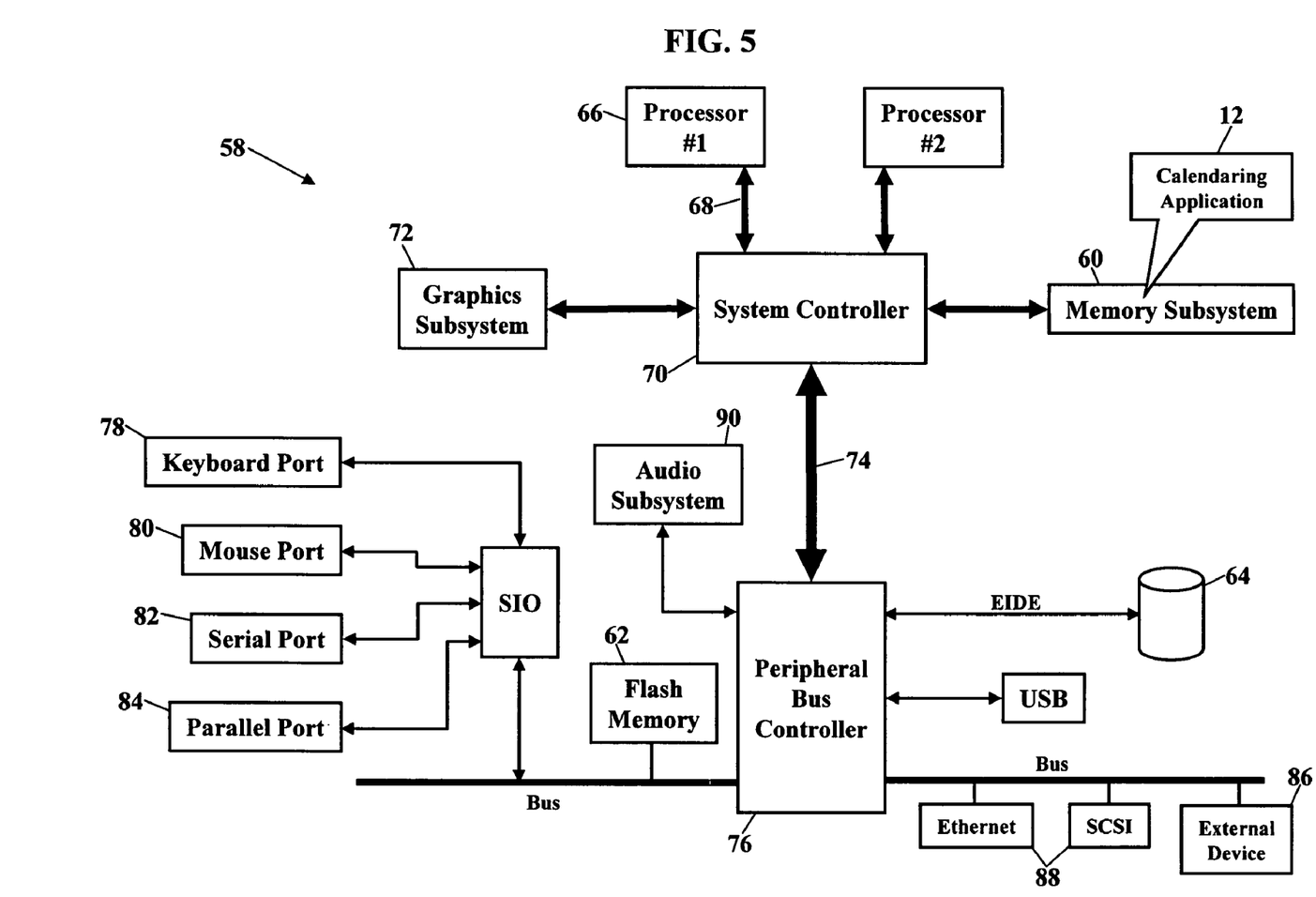
FIG. 5 depicts another operating environment for the exemplary embodiments.

FIG. 5 depicts another possible operating environment for the exemplary embodiments. FIG. 5 is a block diagram showing the calendaring application 12 residing in a computer system 58 (such as the computer server 30 shown in FIG. 4). The computer system 58, however, could also represent any computer, communications device, or processor-controlled device. The calendaring application 12 operates within a system memory device. The calendaring application 12, for example, is shown residing in a memory subsystem 60. The calendaring application 12, however, could also reside in flash memory 62 or peripheral storage device 64. The computer system 58 also has one or more central processors 66 executing an operating system. The operating system, as is well known, has a set of instructions that control the internal functions of the computer system 58. A system bus 68 communicates signals, such as data signals, control signals, and address signals, between the central processor 66 and a system controller 70 (typically called a "Northbridge"). The system controller 70 provides a bridging function between the one or more central processors 66, a graphics subsystem 72, the memory subsystem 60, and a PCI (Peripheral Controller Interface) bus 74. The PCI bus 74 is controlled by a Peripheral Bus Controller 76. The Peripheral Bus Controller 76 (typically called a "Southbridge") is an integrated circuit that serves as an input/output hub for various peripheral ports.

These peripheral ports could include, for example, a keyboard port 78, a mouse port 80, a serial port 82 and/or a parallel port 84 for a video display unit, one or more external device ports 86, and networking ports 88 (such as SCSI or Ethernet). The Peripheral Bus Controller 76 could also include an audio subsystem 90. Those of ordinary skill in the art understand that the program, processes, methods, and systems described herein \are not limited to any particular computer system or computer hardware.

One example of the central processor 66 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080, www.Microsoft.com) operating system may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 60, flash memory 62, or peripheral storage device 64) may also contain an application program. The application program cooperates with the operating system and with a video display unit (via the serial port 82 and/or the parallel port 84) to provide a Graphical User Interface (GUI). The Graphical User Interface typically includes a combination of signals communicated along the keyboard port 78 and the mouse port 80. The Graphical User Interface provides a convenient visual and/or audible interface with a user of the computer system 58.

Figure 6:
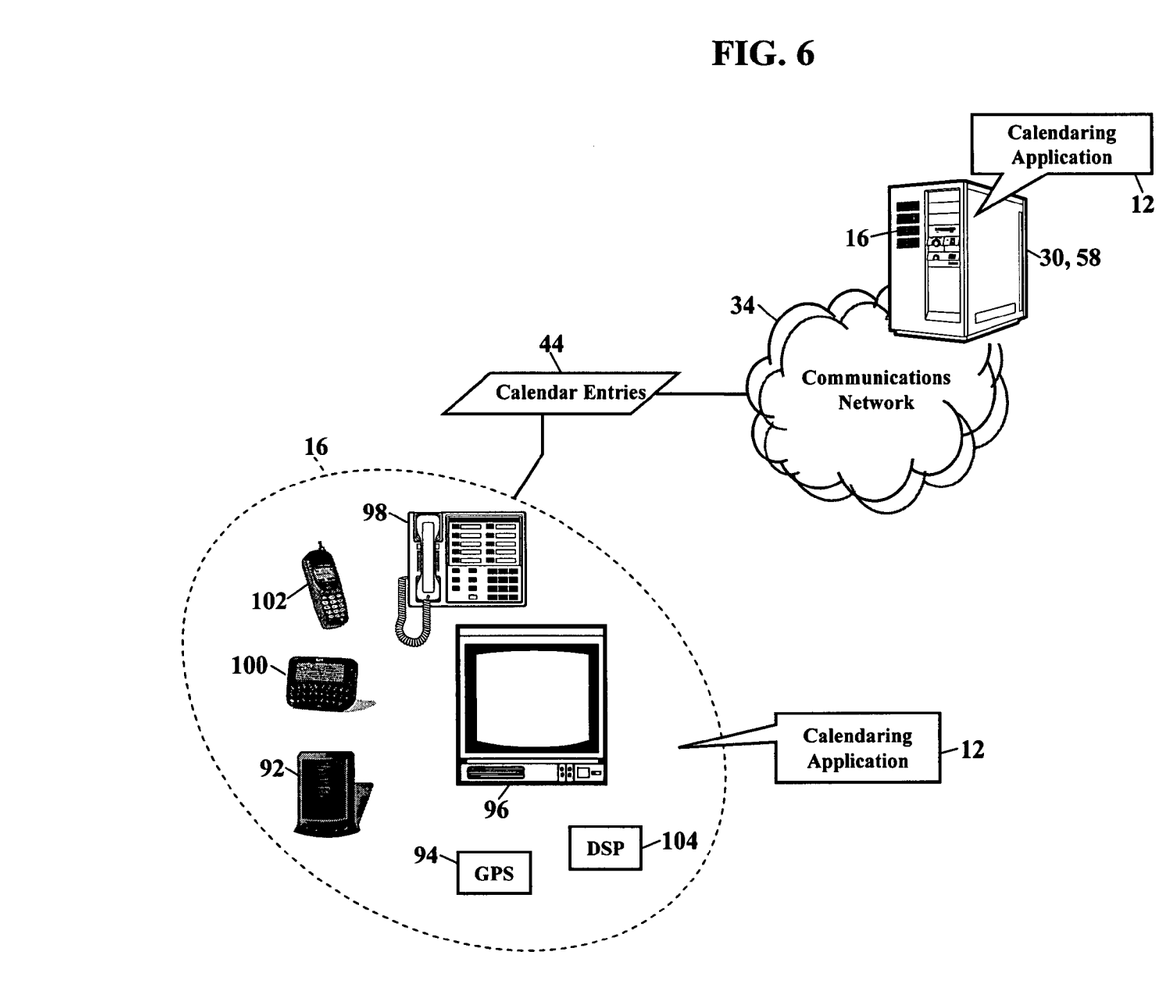
FIG. 6 is a schematic illustrating still more exemplary embodiments operating within various communications devices.

FIG. 6 is a schematic illustrating still more exemplary embodiments. FIG. 6 illustrates that the calendaring application 12 may alternatively or additionally operate within various communications devices 16. FIG. 6, for example, illustrates that the calendaring application 12 may entirely or partially operate within a personal digital assistant (PDA) 92, a Global Positioning System (GPS) device 94, an interactive television 96, an Internet Protocol (IP) phone 98, a pager 100, a cellular/satellite phone 102, or any computer system and/or communications device utilizing a digital signal processor (DSP) 104. The communications device 16 may also include watches, radios, vehicle electronics, clocks, printers, gateways, and other apparatuses and systems.

Figure 7:
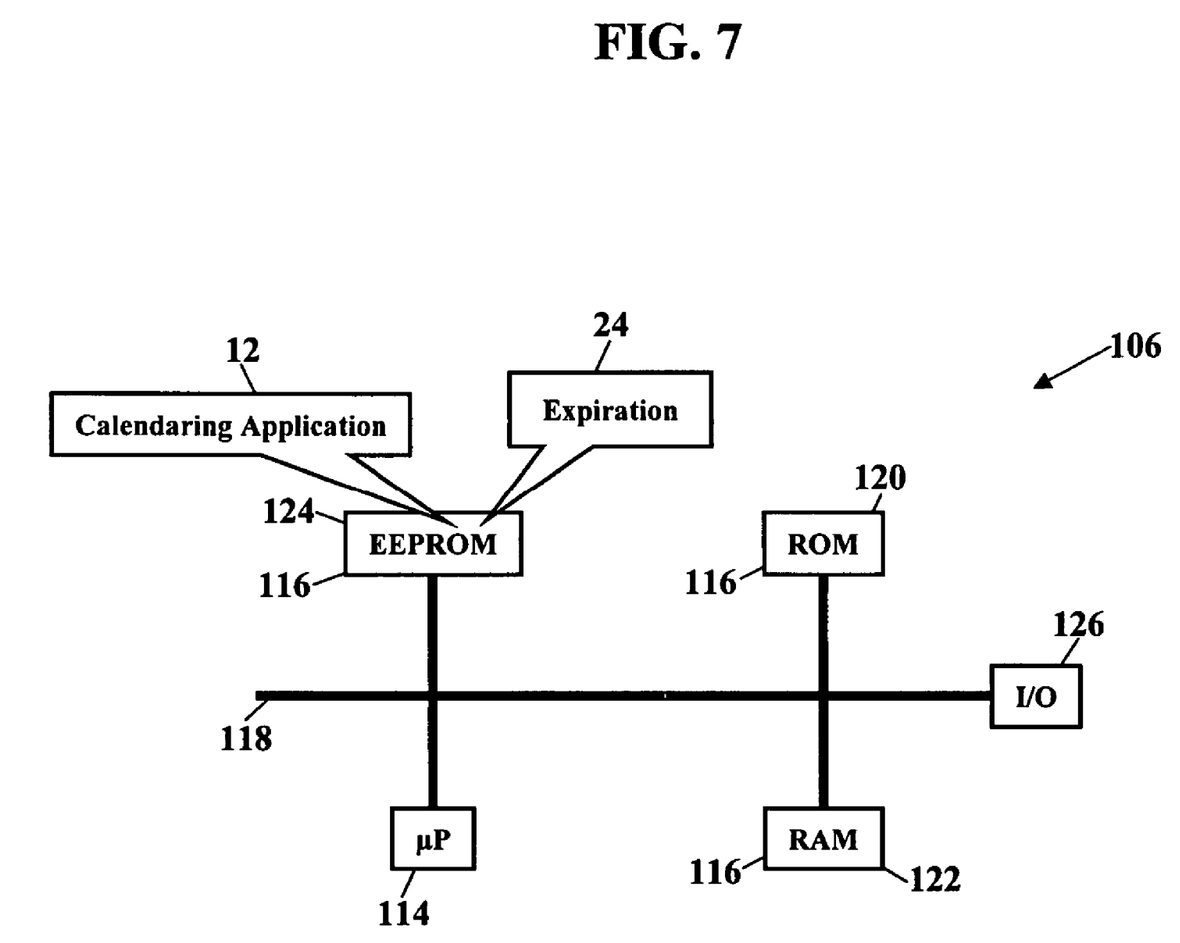
FIGS. 7-9 are schematics further illustrating various communications devices for processing the expiration, according to the exemplary embodiments.
Figure 8:
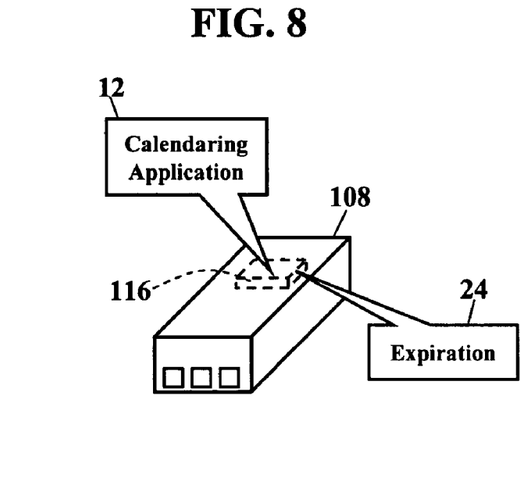
Figure 9:
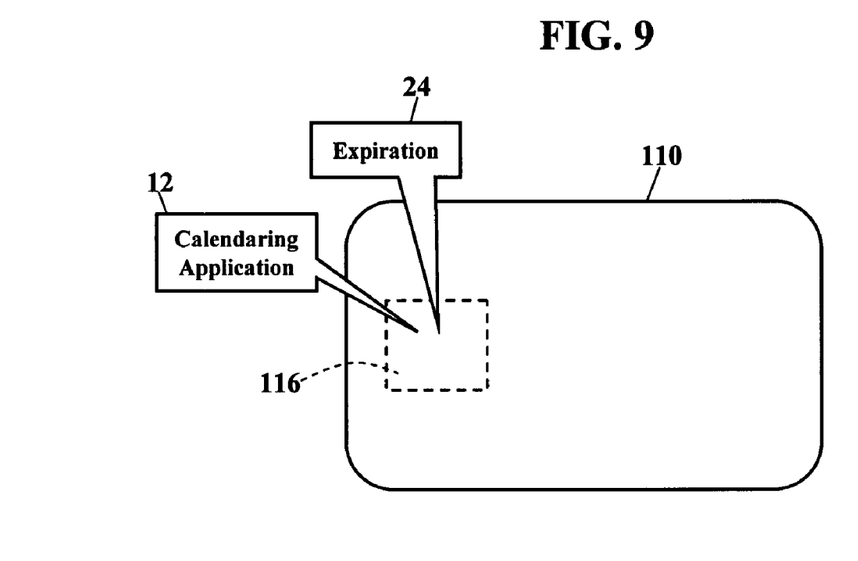

FIGS. 7-9 are schematics further illustrating various communications devices for processing the expiration 24, according to the exemplary embodiments. FIG. 7 is a block diagram of a Subscriber Identity Module 106, while FIGS. 8 and 9 illustrate, respectively, the Subscriber Identity Module 106 embodied in a plug 108 and the Subscriber Identity Module 106 embodied in a card 110. As those of ordinary skill in the art recognize, the Subscriber Identity Module 106 may be used in conjunction with many communications devices (such as the cellular/satellite phone 102 shown in FIG. 6). The Subscriber Identity Module 106 stores user information (such as the user's International Mobile Subscriber Identity, the user's $K_i$ number, and other user information), the expiration 24, and any portion of the calendaring application 12. As those of ordinary skill in the art also recognize, the plug 108 and the card 110 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment* (*Subscriber Identity Module—ME*) *interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone+41 22 749 01 11, Telefax+41 22 733 34 30, www.iso.org).

FIG. 7 is a block diagram of the Subscriber Identity Module 106, whether embodied as the plug 108 of FIG. 8 or as the card 110 of FIG. 9. Here the Subscriber Identity Module 106 comprises a microprocessor 114 (µP) communicating with memory modules 116 via a data bus 118. The memory modules may include Read Only Memory (ROM) 120, Random Access Memory (RAM) and or flash memory 122, and Electrically Erasable-Programmable Read Only Memory (EEPROM) 124. The Subscriber Identity Module 106 stores some or all of the calendaring application 12 in one or more of the memory modules 116. FIG. 7 shows the calendaring application 12 residing in the Erasable-Programmable Read Only Memory 114, yet the calendaring application 12 could alternatively or additionally reside in the Read Only Memory 120 and/or the Random Access/Flash Memory 122. An Input/Output module 126 handles communication between the Subscriber Identity Module 106 and the communications device. As those skilled in the art will appreciate, there are many suitable ways for implementing the operation and physical/memory structure of the a Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 10:
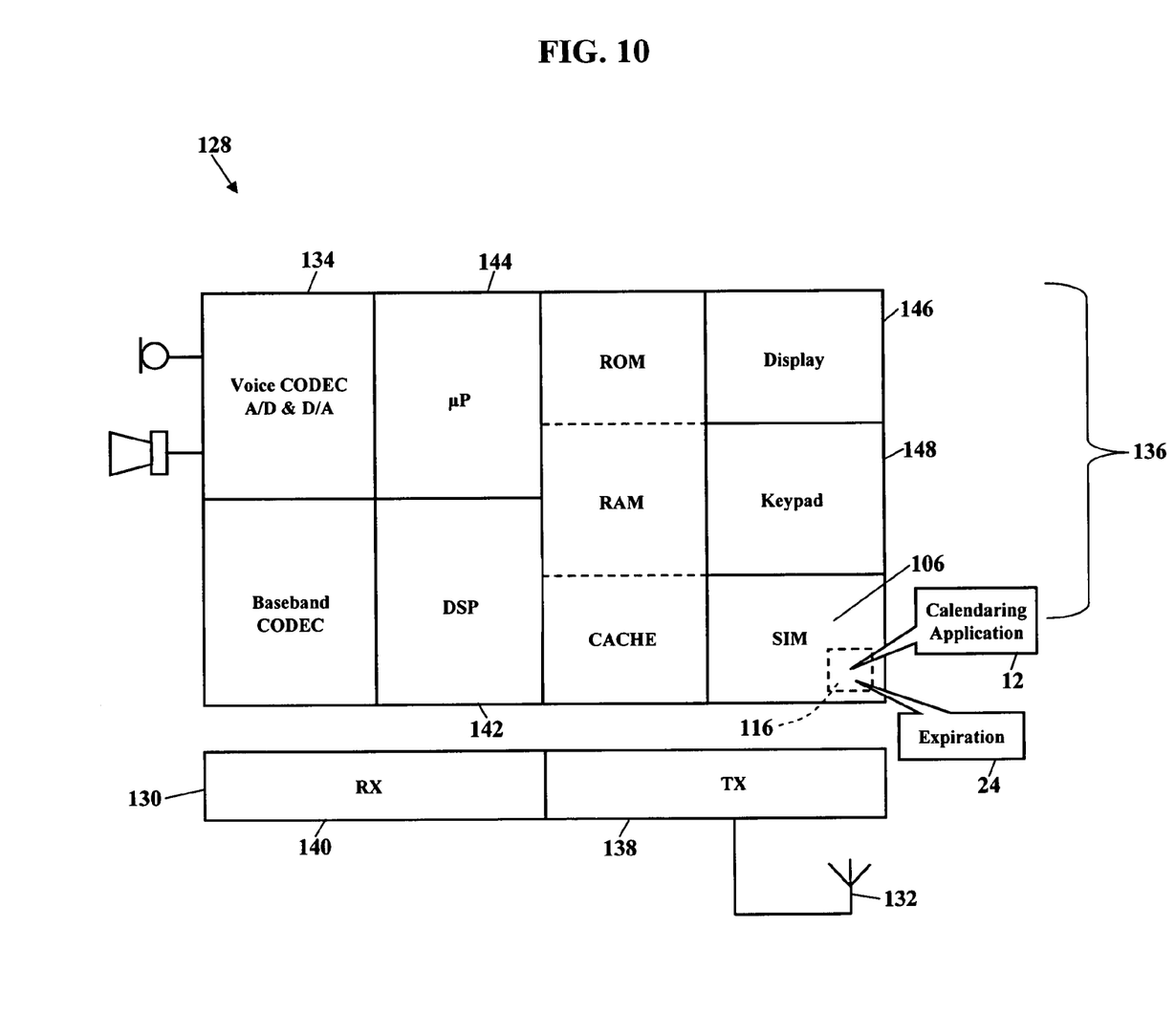
FIG. 10 is a schematic further illustrating various communications devices for processing the expiration, according to the exemplary embodiments.

FIG. 10 is a schematic further illustrating various communications devices for processing the expiration 24, according to the exemplary embodiments. FIG. 10 is a block diagram of another communications device 128 utilizing the expiration 24 in the calendaring application 12. Here the communications device comprises a radio transceiver unit 130, an antenna 132, a digital baseband chipset 134, and a man/machine interface (MMI) 136. The transceiver unit 130 includes transmitter circuitry 138 and receiver circuitry 140 for receiving and transmitting radio-frequency (RF) signals. The transceiver unit 130 couples to the antenna 132 for converting electrical current to and from electromagnetic waves. The digital baseband chipset 134 contains a digital signal processor (DSP) 142 and performs signal processing functions for audio (voice) signals and RF signals. As FIG. 14 shows, the digital baseband chipset 134 may also include an on-board microprocessor 144 that interacts with the man/machine interface (MMI) 136. The man/machine interface (MMI) 136 may comprise a display device 146, a keypad 148, and the Subscriber Identity Module 106. The on-board microprocessor 144 performs GSM protocol functions and control functions for the radio circuitry 138 and 140, for the display device 146, and for the keypad 148. The on-board microprocessor 144 may also interface with the Subscriber Identity Module 106 and with the calendaring application 12 residing in the memory module 116 of the Subscriber Identity Module 106. Those skilled in the art will appreciate that there may be many suitable architectural configurations for the elements of the communications device 128. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The expiration 24 may be utilized regardless of signaling standard. As those of ordinary skill in the art recognize, FIGS. 7-10 illustrate a Global System for Mobile (GSM) communications device. That is, the communications device utilizes the Global System for Mobile (GSM) communications signaling standard. Those of ordinary skill in the art, however, also recognize the concepts of the expiration 24 are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 11:
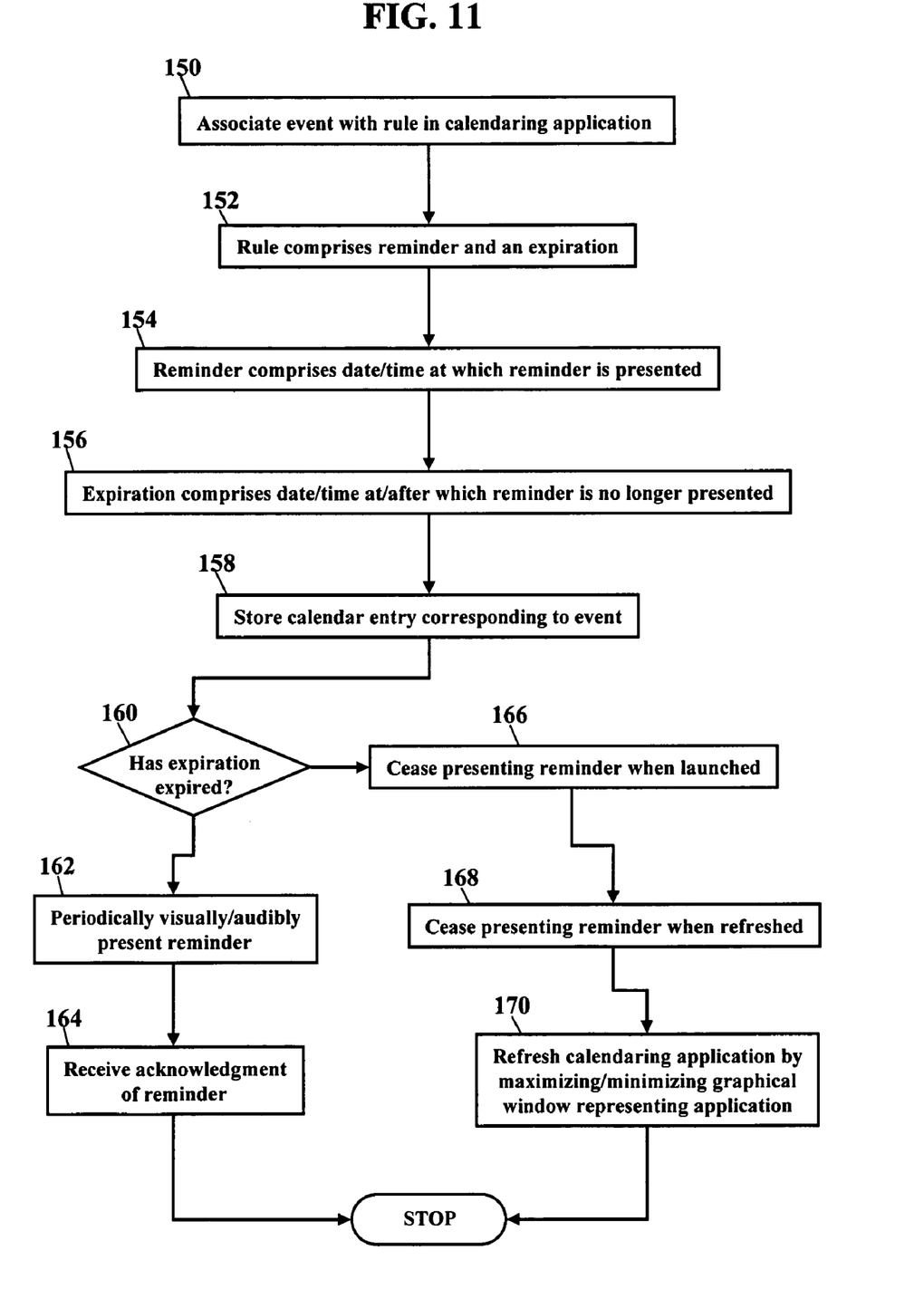
FIG. 11 is a flowchart illustrating a method of managing an event in a calendaring application according to an exemplary embodiment.

FIG. 11 is a flowchart illustrating a method of managing an event in a calendaring application according to an exemplary embodiment. The calendaring application associates the event with a rule (Block 150). The rule comprises a reminder and an expiration (Block 152). The reminder comprises a date and a time at which the reminder is presented (Block 154). The expiration, on the other hand, may comprise a date and a time at/after which the reminder is no longer presented (Block 156). A calendar entry is stored that corresponds to the event (Block 158). Prior to expiration (Block 160) the calendaring application periodically presents the reminder until the expiration (Block 162). The calendaring application may visually and/or audibly present the reminder of the event. The calendaring application may receive an acknowledgment of the reminder (Block 164). After the expiration (Block 160), however, the calendaring application ceases to present the reminder when launched (Block 166). After the expiration, and when the calendaring application is refreshed, the calendaring application ceases to present the reminder (Block 168). The calendaring application may be refreshed by maximizing a graphical window representing the calendaring application (Block 170).

The calendaring application (shown as reference numeral 12 in FIGS. 1-10) may be physically embodied on or in a computer-readable medium. This computer-readable medium may include computer readable storage medium that includes CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other tangible types not mention here but considered within the scope of the exemplary embodiments, allow the calendaring application to be easily disseminated. A computer program product comprises the calendaring application stored on the computer-readable medium. The calendaring application comprises computer-readable instructions/code for associating an event with a rule. The rule comprises a reminder and an expiration. A calendar entry corresponding to the event is stored. After the expiration, when the calendaring application is launched, the calendaring application ceases to present the reminder.

The calendaring application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of managing events in a calendaring application, comprising:

establishing profiles for different types of events;

receiving a selection of a profile;

automatically establishing parameters for a rule according to the selected profile;

associating an event with the rule, the rule comprising a predefined reminder and an expiration, the expiration defining a date after which the predefined reminder is no longer produced, the profile automatically establishing a date and a time at which the predefined reminder is first presented and automatically establishing a predefined interval at which the predefined reminder is re-presented;

storing a calendar entry corresponding to the event;

upon the date of expiration, disposing of a portion of the rule that defines the predefined reminder;

ceasing processing of any rules having expired events;

after the date of expiration, ceasing to present the predefined reminder when launching the calendaring application, wherein ceasing to present includes the event remaining on a user's calendar, but no reminders of expired events are presented by the calendaring application; and ceasing to present the predefined reminder when refreshing the calendaring application upon maximizing or minimizing a graphical window representing the calendaring application.

2. A method according to claim 1, further comprising configuring the predefined reminder to expire at an overdue date.

3. A method according to claim 1, further comprising presenting the predefined reminder of the event prior to the expiration.

4. A method according to claim 1, further comprising configuring the expiration to resume reminders at a future date, thus producing reminders of a past task that was not accomplished.

5. A method according to claim 1, further comprising periodically presenting the predefined reminder until the expiration.

6. A method according to claim 1, further comprising receiving an acknowledgement of the predefined reminder.

7. A system for managing recurring events in a calendaring application, comprising:
   a processor executing code stored in memory, the code causing the processor to:
   launch the calendaring application;
   establish profiles for different types of events;
   receive a selection of a profile;
   automatically establish parameters for a rule according to the selected profile;
   associate an event with the rule, the rule comprising a predefined reminder, an expiration, and an associated predefined interval, the expiration defining a date after which the predefined reminder is no longer produced, the profile automatically establishing a date and a time at which the predefined reminder is first presented and automatically establishing the predefined interval at which the predefined reminder is subsequently re-presented until the expiration;
   store a calendar entry corresponding to the event;
   upon the date of expiration, dispose of a portion of the rule that defines the predefined reminder;
   recur the expiration of the event;
   minimize a graphical window associated with the calendaring application;
   when the graphical window is maximized, then trigger a refresh of the calendaring application to review events and to cease processing expired rules;
   cancel an expired recurring event without user interaction; and
   after the date of expiration, cease to present the predefined reminder when launching the calendaring application, wherein ceasing to present includes the event remaining on a users calendar, but no reminders of an expired recurring event is presented by the calendaring application.

8. A system according to claim 7, further operative to configure the predefined reminder to expire at an overdue date.

9. A system according to claim 7, further operative to present the predefined reminder of the event prior to the expiration.

10. A system according to claim 7, further operative to configure the expiration to resume reminders at a future date, thus producing reminders of a past task that was not accomplished.

11. A system according to claim 7, further operative to periodically present the predefined reminder until the expiration.

12. A system according to claim 7, further operative to receive an acknowledgement of the predefined reminder.

13. A computer program product comprising computer-readable storage medium storing processor executable code for performing a method of managing recurring events in a calendaring application, the method comprising:
   establishing profiles for different types of events;
   receiving a selection of a profile from a menu of profiles;
   automatically establishing parameters for a rule according to the selected profile;
   associating each recurring event with a rule, the rule comprising a predefined reminder, a predefined expiration, and an associated predefined interval, the predefined expiration defining a date after which the predefined reminder is no longer produced, the predefined interval causing presentation of the predefined reminder and subsequent presentations of the predefined reminder according to the predefined interval until the predefined expiration;
   storing a calendar entry corresponding to each recurring event;
   upon the date of expiration, disposing of a portion of the rule that defines the predefined reminder;
   recurring the expiration of each recurring event;
   minimizing a graphical window associated with the calendaring application;
   when the graphical window is maximized, then trigger a refresh of the calendaring application to review events and to cease processing expired rules;
   canceling expired recurring event without user interaction; and
   after the date of expiration, ceasing to present the predefined reminder when launching the calendaring application, wherein ceasing to present includes the event remaining on a users calendar, but no reminders of expired recurring events are presented by the calendaring application.

14. A computer program product according to claim 13, further comprising code for configuring the predefined reminder to expire at an overdue date.

15. A computer program product according to claim 13, further comprising computer code for presenting the predefined reminder of the event prior to the expiration.

16. A computer program product according to claim 13, further comprising computer code for configuring the expiration to resume reminders at a future date, thus producing reminders of a past task that was not accomplished.

17. A computer program product according to claim 13, further comprising computer code for periodically presenting the predefined reminder until the expiration.

* * * * *